United States Patent
Andre et al.

(10) Patent No.: US 7,115,050 B2
(45) Date of Patent: Oct. 3, 2006

(54) SCRATCH RESISTANT COATING COMPOSITIONS FOR GOLF EQUIPMENT

(75) Inventors: Kieran F. Andre, Fairhaven, MA (US); Colin W. Veitch, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/910,829

(22) Filed: Aug. 4, 2004

(65) Prior Publication Data

US 2006/0030663 A1  Feb. 9, 2006

(51) Int. Cl.
*A63B 37/12*  (2006.01)

(52) U.S. Cl. .................... 473/378; 473/377; 524/588

(58) Field of Classification Search ........... 473/377, 473/378; 524/588
See application file for complete search history.

(56) References Cited

U.S. PATENT DOCUMENTS

| | | | |
|---|---|---|---|
| 4,798,386 A | 1/1989 | Berard | 273/235 |
| 4,871,589 A | 10/1989 | Kitaoch et al. | 427/322 |
| 5,000,458 A | 3/1991 | Proudfit | 273/235 |
| 5,029,870 A * | 7/1991 | Concepcion et al. | 473/376 |
| 5,300,325 A | 4/1994 | Nealon et al. | 427/379 |
| 5,409,233 A | 4/1995 | Kennedy | 273/235 |
| 5,461,109 A | 10/1995 | Blair et al. | 524/839 |
| 5,669,831 A * | 9/1997 | Lutz | 473/377 |
| 5,725,443 A * | 3/1998 | Sugimoto et al. | 473/378 |
| 5,820,491 A | 10/1998 | Hatch et al. | 473/378 |
| 5,922,475 A | 7/1999 | Barancyk et al. | 428/482 |
| 5,976,701 A | 11/1999 | Barancyk et al. | 428/423.1 |
| 6,348,016 B1 * | 2/2002 | Nakamura | 473/371 |
| 6,398,669 B1 * | 6/2002 | Yokota et al. | 473/378 |
| 6,596,837 B1 | 7/2003 | Hogge et al. | 528/49 |
| 6,657,001 B1 | 12/2003 | Anderson et al. | 524/588 |
| 6,861,492 B1 * | 3/2005 | Wu et al. | 528/28 |
| 2003/0114624 A1 * | 6/2003 | Harris et al. | 528/28 |

OTHER PUBLICATIONS

"Polysiloxane Topcoats—Product Choice for Optimum Performance" by Adrian F. Andrews, International Protective Coatings Akzo Nobel.

Properties and use of inorganic polysiloxane hybrid coatings for the protective coatings industry. by J.M. Keijman.

* cited by examiner

*Primary Examiner*—Margaret G. Moore
(74) *Attorney, Agent, or Firm*—Mandi B. Milbank

(57) ABSTRACT

The present invention is directed to a scratch-resistant composition for golf equipment comprising at least one polysiloxane having at least one functional group, at least one reactant having a functional group that is reactive to the at least one functional group of the at least one polysiloxane, and a plurality of particles further comprising inorganic, organic and composite particles, wherein the composition shows an improvement in scratch resistance. The present invention is also directed to golf equipment such as golf ball coated with the scratch-resistant composition. The present is also directed to methods of coating golf equipment with the scratch-resistant composition.

12 Claims, No Drawings

SCRATCH RESISTANT COATING COMPOSITIONS FOR GOLF EQUIPMENT

FIELD OF THE INVENTION

The present invention relates to scratch-resistant coating compositions for golf equipment comprising at least one polysiloxane having at least one functional group, at least one reactant having a functional group that is reactive to the at least one functional group of the at least one polysiloxane, and a plurality of particles such as inorganic, organic, or composite particles. These compositions have been adapted for application to golf equipment, in particular golf balls, range balls, golf clubs, golf shoes, drive heads, and golf bags, for improving the scratch resistance of the coated surfaces.

BACKGROUND OF THE INVENTION

Materials used in forming golf ball covers, such as balata, SURLYN®, and urethane elastomer, suffer from scratching, abrasion and shear produced by multiple oblique hits by a golf club. It is known that coatings can be applied to the surface of golf balls to increase the abrasion resistance of the coated surfaces but the results achieved with the use of such coatings have not entirely met the requirements of the golfing public. Thus, there is a need to improve the scratch resistance of such coating materials.

More than five hundred million golf balls are produced each year. Most of these balls have covers molded from the ionomeric resin SURLYN® or its counterparts and, to a lesser extent, balata (i.e., trans polyisoprene) and polyurethane. Conventionally, coating compositions are applied to the ball surface to protect the ball, the identifying indicia and any paint layers, and to add a pleasing appearance to the ball due to their high gloss. Typically such coatings comprise a clear primer coat and a clear top coat, and for certain applications a single top coat may suffice. The primer layer is applied to promote adhesion or to smooth the surface roughness before the top coat(s) are added to the golf ball. Coating compositions are generally free of pigmentation and are water white. However, they may contain small amounts of dye, pigment, and optical brighteners so long as they still allow for a bright ball cover. In golf balls of the type described above, the various identifying indicia may be applied either directly upon or alternatively upon the cover, the primer coat or the top coat.

Coating composition materials are well known in the art. Generally, they consist of urethanes, urethane hybrids, polyesters and acrylics. In particular, a cured polyurethane top coat is most widely used as a protective coating composition material. Polyurethane systems are typically either "one component" or "two component" systems.

U.S. Pat. No. 5,820,491 to Hatch et al., incorporated herein by reference in its entirety, relates to a polyurethane topcoat composition for golf balls comprising at least three components: (a) a polyol component, (b) an isocynate component, and (c) a hydroxyl functional, polyether-modified polysiloxane copolymer.

U.S. Pat. No. 6,596,837 to Hogge et al., incorporated herein by reference in its entirety, relates to golf equipment having a coating comprising (a) a reactive component A of a polyol, (b) a reactive component B of an isocyanate, (c) a colloidal silica, (d) a coupling agent to react with the colloidal silica, and (e) a solvent.

U.S. Pat. No. 6,657,001 to Anderson et al., incorporated herein by reference in its entirety, relates to coating compositions comprising (a) one or more polysiloxanes having at least one reactive functional group, (b) at least one reactant having one reactive functional group, and (c) a plurality of particles selected from inorganic particles and composite particles. However, the coating composition according to this reference is used only as automotive coatings, and the use of the composition on golf equipments is not taught or suggested in this reference.

There remains a need for scratch-resistant coating compositions for golf equipment comprising at least one polysiloxane having at least one functional group, at least one reactant having a functional group that is reactive to the at least one functional group of the at least one polysiloxane, and a plurality of particles such as inorganic, organic or composite particles, such that these compositions may be applied to golf equipment, in particular golf balls, range balls, golf clubs, golf shoes, drive heads, and golf bags, for improving the scratch resistance of the coated surfaces.

SUMMARY OF THE INVENTION

The present invention is directed to a scratch-resistant composition for golf equipment comprising at least one polysiloxane having at least one functional group, at least one reactant having a functional group that is reactive to the at least one functional group of the at least one polysiloxane, and a plurality of particles further comprising inorganic, organic and composite particles. The composition shows an improvement in scratch resistance. The at least one polysiloxane can be represented by the formula:

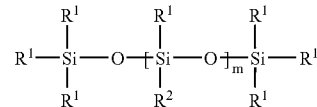

wherein m is an integer between 1–75. $R^1$ may be H, OH, a monovalent hydrocarbon group, or a monovalent siloxane group, $R^2$, which may be identical to or different from $R^1$, represents at least one functional group comprising a hydroxyl group, a carboxyl group, an thioisocyanate group, a blocked polythioisocyanate group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In one embodiment of the invention, the polysiloxane can be represented by either one of the following two structures:

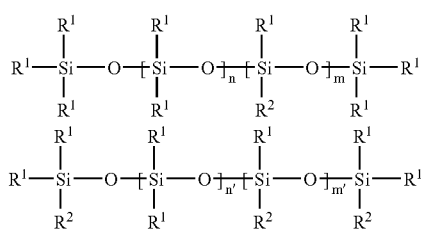

wherein m ranges from 1 to 75; m' ranges from 0 to 75; n ranges from 0 to 75; n' ranges from 0 to 75. Each $R^1$, which may be identical or different, is selected from H, OH, a monovalent hydrocarbon group, a monovalent siloxane group, and mixtures of any of the foregoing. $R^2$ comprises the following structure:

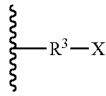

wherein —$R^3$— is selected from an alkylene group, an oxyalkylene group, an alkylene aryl group, an alkenylene group, an oxyalkenylene group, and an alkenylene aryl group. X represents a group which comprises at least one reactive functional group selected from a hydroxyl group, a carboxyl group, an thioisocyanate group, a blocked polythioisocyanate group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In the present invention, the at least one reactant having a functional group can be represented by the general formula:

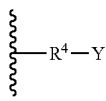

wherein $R^4$ is selected from an alkylene group, an oxyalkylene group, an alkylene aryl group, an alkenylene group, an oxyalkenylene group, and an alkenylene aryl group. Y represents a group further comprising at least one reactive functional group selected from a hydroxyl group, a carboxyl group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In the present invention, the plurality of particles further comprises at least one of inorganic, organic and composite particles having size of about 1 nm to about 200 nm. In another embodiment of the invention, the plurality of particles further comprises fumed silica, amorphous silica, colloidal silica, alumina, colloidal alumina, titanium oxide, cesium oxide, yttrium oxide, colloidal yttria, zirconia, colloidal zirconia, polyethylene terephthalate, polybutylene terephthalate, polyethylene naphthalate, vinyl esters, epoxy materials, phenolics, aminoplasts, polyurethanes and composite particles of silicon carbide or aluminum nitride coated with silica or carbonate.

The present invention is also directed to a golf equipment, or a portion thereof, having a scratch-resistant coating comprising at least one polysiloxane having at least one functional group, at least one reactant having a functional group that is reactive to the at least one functional group of the at least one polysiloxane, and a plurality of particles further comprising inorganic, organic and composite particles, wherein the composition shows an improvement in scratch resistance.

The present invention is also directed to a golf ball coated with a scratch-resisting coating having a composition comprising at least one polysiloxane having at least one functional group, at least one reactant having a functional group that is reactive to the at least one functional group of the at least one polysiloxane, and a plurality of particles further comprising inorganic, organic and composite particles, wherein the composition shows an improvement in scratch resistence.

The present invention is also directed to a method of forming the top coat for golf equipment, or a portion thereof, comprising the steps of mixing at least one polysiloxane having at least one functional group, at least one reactant having a functional group that is reactive to the at least one functional group of the at least one polysiloxane, and a plurality of particles further comprising inorganic, organic and composite particles to form a mixture, applying the mixture to an outer surface of the golf equipment to form a coating, and curing the coating in situ on the outer surface of the golf equipment.

In one embodiment of the invention, the applying step of the method comprises at least one of spraying, brushing, or dipping the material onto the outer surface.

In another embodiment, the curing step of the method is achieved by ultraviolet radiation, electron beam radiation, heat, or a combination thereof.

In another embodiment of the invention, the curing step further comprises solvent evaporation from a water-based or organic based solvent system.

DETAILED DESCRIPTION OF THE INVENTION

The term "about," as used herein, should generally be understood to refer to both numbers in a range of numerals. Moreover, all numerical ranges herein should be understood to include each whole integer within the range.

As used herein, the term "golf equipment" is meant to refer broadly to any type of equipment used in connection with golf, including, but not limited to, golf balls, golf clubs (i.e., putters, drivers, and wedges) and club attachments, additions, or modifications, such as striking face inserts; golf club components (i.e., shafts, hosels, and grips); golf club vibration damping devices; golf gloves and portions thereof, such as glove liners, securing methods, patches, and reinforcements; golf shoes and associated components (i.e., soles, footbeds and spike socket spines, heel counters, toe "puffs," uppers, midsoles, outsoles, liners, and plastic golf spikes); golf bags and their associated framework, support legs, and stands; and any portion of the above items.

As used herein, the term "reactive" refers to a functional group that forms a covalent bond with another functional group under conditions sufficient to cure the composition.

As used herein in reference to a golf ball, the term "core" represents the center and optional additional layer(s), such as an intermediate layer, which layer(s) is(are) disposed between the center and the cover of the golf ball.

As used herein, "monovalent" refers to a substituent group that, as a substituent group, forms only one single, covalent bond.

As used herein, "hydrocarbon groups" are intended to encompass both branched and unbranched hydrocarbon groups.

As used herein, a "monovalent hydrocarbon group" means a monovalent group having a backbone repeat unit based exclusively on carbon.

As used herein, "lower alkyl" refers to alkyl groups having from 1 to 6 carbon atoms.

As used herein, "heteroatoms" means elements other than carbon, for example, oxygen, nitrogen, and halogen atoms.

As used herein, "siloxane" means a group comprising a backbone comprising two or more —SiO— groups.

As used herein, "alkylene" refers to an acyclic or cyclic, saturated hydrocarbon group having a carbon chain length of from $C_2$ to $C_{25}$.

As used herein, "oxyalkylene" refers to an alkylene group containing at least one oxygen atom bonded to, and interposed between, two carbon atoms and having an alkylene carbon chain length of from $C_2$ to $C_{25}$.

As used herein, "alkylene aryl" refers to an acyclic alkylene group substituted with at least one aryl group, for example, phenyl, and having an alkylene carbon chain length of $C_2$ to $C_{25}$.

As used herein, "alkenylene" refers to an acyclic or cyclic hydrocarbon group having one or more double bonds and having an alkenylene carbon chain length of $C_2$ to $C_{25}$.

As used herein, "ungelled" refers to a reaction product that is substantially free of crosslinking and has an intrinsic viscosity when dissolved in a suitable solvent, as determined, for example, in accordance with ASTM-D1795 or ASTM-D4243.

As used herein, a reaction product that is "substantially free of crosslinking" refers to a reaction product that has a weight average molecular weight (Mw), as determined by gel permeation chromatography, of less than 1,000,000.

As used herein, the term "inorganic material" means any material that is not an organic material.

As used herein, the term "polymeric inorganic material" means a polymeric material having a backbone repeat unit based on an element or elements other than carbon.

As used herein, "transparent" means that the cured coating has a BYK Haze index of less than 50 as measured using a BYK/Haze Gloss instrument.

As used herein, an "organic material," means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, etc.; and carbon-containing ionic compounds such as metallic carbonates, for example, calcium carbonate and sodium carbonate.

As used herein, the term "polymeric organic materials" means synthetic polymeric materials, semisynthetic polymeric materials and natural polymeric materials, all of which have a backbone repeat unit based on carbon.

As used herein, a "thermoplastic" material is a material that softens when exposed to heat and returns to its original condition when cooled to room temperature.

As used herein, a "thermoset" material is a material that solidifies or "sets" irreversibly when heated presumably by forming a crosslinked network.

As used herein, the term "composite material" means a combination of two or more differing materials.

As used herein, "colloidal silica" should be understood to be distinct from "solid silica," which refers to compounds such as hydrous silicic acid and silicic anhydride that are not included within the colloidal silicas of the invention. "Colloidal silica" refers to silica disposed in a solvent.

As used herein, the phrase "each component is different" refers to components which do not have the same chemical structure as other components in the composition.

As used herein, the term "cure" as used in connection with a composition, e.g., "a cured composition," shall mean that any crosslinkable components of the composition are at least partially crosslinked.

As used herein, a polymeric material is "crosslinked" if it at least partially forms a polymeric network.

As used herein, "ionizing radiation" means high energy radiation and/or the secondary energies resulting from conversion of this electron or other particle energy to neutron or gamma radiation, said energies being at least 30,000 electron volts and can range from 50,000 to 300,000 electron volts.

As used herein, "actinic radiation" is light with wavelengths of electromagnetic radiation ranging from the ultraviolet ("UV") light range, through the visible light range, and into the infrared range.

As used herein, "substantially all" is defined as at least about 90 percent, preferably at least about 95 percent, and more preferably at least about 99 percent, of the coating remains adhered to the golf ball.

The present invention is related to scratch-resistant coating compositions for golf equipment comprising (a) at least one polysiloxane having at least one functional group, (b) at least one reactant having a functional group that is reactive to the at least one functional group of the at least one polysiloxane, and (c) a plurality of particles such as inorganic, organic, and composite particles, wherein the coated surface shows an improvement in scratch resistance.

The at least one polysiloxane can be represented by the general formula:

$$R^1-\underset{\underset{R^1}{|}}{\overset{\overset{R^1}{|}}{Si}}-O-\left[\underset{\underset{R^2}{|}}{\overset{\overset{R^1}{|}}{Si}}-O\right]_m-\underset{\underset{R^1}{|}}{\overset{\overset{R^1}{|}}{Si}}-R^1$$

wherein m ranges from 1 to 75, $R^1$ may be H, OH, a monovalent hydrocarbon group, or a monovalent siloxane group, and $R^2$, which may be identical to or different from $R^1$, comprises the following structure:

$$\xi-R^3-X$$

wherein —$R^3$— is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an thioisocyanate group, a blocked polythioisocyanate group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

Regarding R¹, a monovalent group on the at least one polysiloxane will form one single covalent bond to a silicon atom in the backbone of the at least one polysiloxane polymer. Thus, a monovalent hydrocarbon group is a hydrocarbon group that can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. One or more of the hydrogen atoms of the hydrocarbon can be substituted with heteroatoms.

The siloxane groups represented by R¹, which is discussed above, and R², which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example oxygen, nitrogen, and halogen atoms, reactive functional groups, for example those reactive functional groups discussed above with reference to R², and mixtures of any of the foregoing.

In one embodiment, the present invention is directed to a composition as previously described, wherein the at least one polysiloxane comprises at least two reactive functional groups. The at least one polysiloxane can have a reactive group equivalent weight ranging from 50 to 1000 mg per gram of the at least one polysiloxane. In one embodiment, the at least one polysiloxane has a hydroxyl group equivalent weight ranging from 50 to 1000 mg KOH per gram of the at least one polysiloxane.

In another embodiment, the at least one polysiloxane has a hydroxyl group equivalent weight ranging from 100 to 300 mg KOH per gram of the at least one polysiloxane, while in another embodiment, the hydroxyl group equivalent weight ranges from 100 to 500 mg KOH per gram. The hydroxyl equivalent weight may range between any combination of these values inclusive of the recited values.

In another embodiment, the present invention is directed to a composition as previously described, wherein at least one R² group represents a group comprising at least one reactive functional group selected from a hydroxyl group and a carbamate group. In yet another embodiment, the present invention is directed to a composition as previously described, wherein at least one R² group represents a group comprising at least two reactive functional groups selected from a hydroxyl group and a carbamate group. In another embodiment, the present invention is directed to a composition as previously described, wherein at least one R² group represents a group comprising an oxyalkylene group and at least two hydroxyl groups.

In another embodiment, the present invention is directed to a composition as previously described, wherein the at least one polysiloxane has either one of the following two structures:

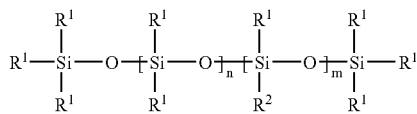

-continued

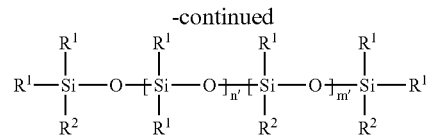

wherein m ranges from 1 to 75; m' ranges from 0 to 75; n ranges from 0 to 75; and n' ranges from 0 to 75;

each R¹, which may be identical or different, is selected from H, OH, a monovalent hydrocarbon group, a monovalent siloxane group, and mixtures of any of the foregoing, and R² comprises the following structure:

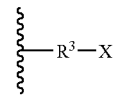

wherein R³ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an thioisocyanate group, a blocked polythioisocyanate group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as $—(CH_2)_3OCH_2C(CH_2OH)_2—(CH_2CH_2)—$.

The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α,α-dimethylbenzyl isocyanate, such as $—(CH_2)_2C_6H_4—$ and $—CH_2CH(CH_3)C_6H_3(C)(CH_3)_2(NCO)$. As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol.

In another embodiment of this invention, the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By careful choice of reactants, compounds having an alternating structure or blocks of alternating structure may be used.

In one embodiment, the present invention is directed to a composition as previously described wherein the substituent group $R^3$ represents an oxyalkylene group. In another embodiment, $R^3$ represents an oxyalkylene group, and X represents a group which comprises at least two reactive functional groups.

In another embodiment, the present invention is directed to any composition as previously described comprising at least one polysiloxane, wherein (n+m) ranges from 2 to 9. In yet another embodiment, in compositions comprising at least one polysiloxane wherein (n+m) ranges from 2 to 3. In another embodiment, in compositions comprising at least one polysiloxane wherein (n'+m') ranges from 2 to 9. In another embodiment, in compositions comprising at least one polysiloxane wherein (n'+m') ranges from 2 to 3.

In one embodiment, the present invention is directed to any composition as previously described wherein X represents a group comprising at least one reactive functional group selected from a hydroxyl group and a carbamate group. In another embodiment, the present invention is directed to composition as previously described wherein X represents a group which comprises at least two hydroxyl groups. In yet another embodiment, the present invention is directed to any composition as previously described wherein X represents a group which comprises at least one group selected from H, a monohydroxy-substituted organic group, and a group having one of the following structures:

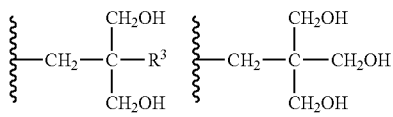

In one embodiment, the present invention is directed to any composition as previously described comprising at least one polysiloxane having the structure wherein, if no curing agent is present, and if the at least one polysiloxane is a partial condensate of a silanol, then less than 70% by weight of the partial condensate is the partial condensate of $CH_3Si(OH)_3$. These components used in these various embodiments can be selected from the coating components discussed above.

In one embodiment, the present invention is directed to compositions as previously described wherein the at least one polysiloxane, when added to the other component(s) of the composition, is present in the composition in an amount ranging from 0.01 to 90 weight percent based on total weight of the resin solids of the components which form the composition.

In another embodiment, the present invention is directed to compositions as previously described wherein the at least one polysiloxane, when added to the other component(s) of the composition, is present in the composition in an amount from at least 2 weight percent based on total weight of the resin solids of the components which form the composition.

In another embodiment, the present invention is directed to compositions as previously described wherein the at least one polysiloxane, when added to the other component(s) of the composition, is present in the composition in an amount from at least 5 weight percent based on total weight of components which form the composition.

In yet another embodiment, the present invention is directed to compositions as previously described wherein the at least one polysiloxane, when added to the other component(s) of the composition, is present in the composition in an amount from at least 10 weight percent based on total weight of the resin solids of the components which form the composition.

In another embodiment, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight.

A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in the at least on reactant, which can be selected to obtain an ungelled reaction product. In other words, when a polysiloxane containing silicon hydride having a higher average value of Si—H functionality is used, the at least one reactant can have a lower level of unsaturation. For example, the polysiloxane containing silicon hydride can be a low molecular weight material where n' ranges from 0 to 5 and the average value of Si—H functionality is two or less. In this case, the at least one reactant can contain two or more unsaturated bonds capable of undergoing hydrosilylation reaction without the occurrence of gelation.

Nonlimiting examples of polysiloxanes containing silicon hydride include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two.

According to this invention of scratch-resistant coating compositions for golf equipment, there is at least one reactant having a functional group that is reactive to the at least one functional group of the at least one polysiloxane. The at least one reactant having a functional group can be represented by the general formula:

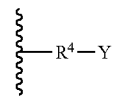

wherein $R^4$ is selected from an alkylene group, an oxyalkylene group, an alkylene aryl group, an alkenylene group, an oxyalkenylene group, and an alkenylene aryl group; and Y represents a group which is reactive to the group represented by X selected from a hydroxyl group, a carboxyl group, a primary amine group, a secondary amine group, an amide group, a carbamate group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

The reaction between the X group of the polysiloxane and the Y group of the reactant can be illustrated by the following non-limiting examples:

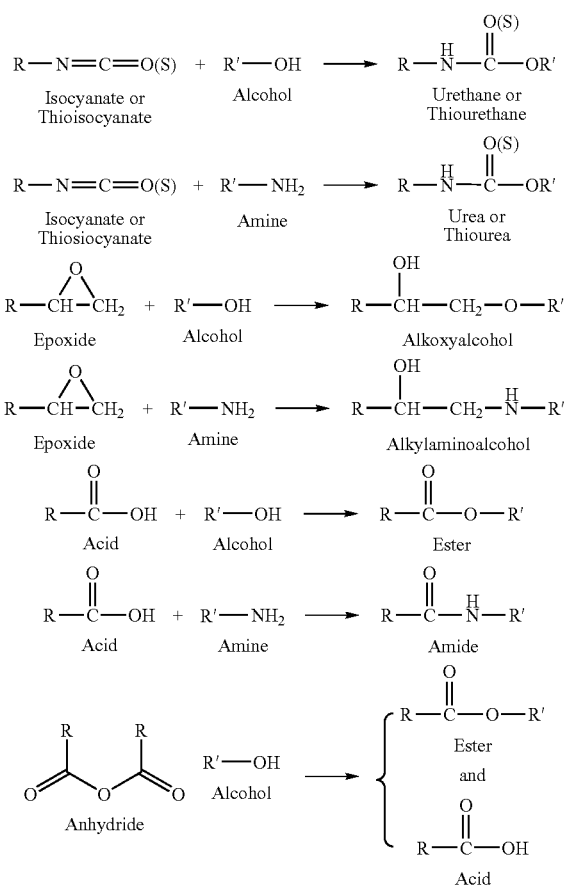

In one embodiment of this invention, the at least one reactant having a functional group that is reactive to the at least one functional group of the at least polysiloxane can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, the at least one reactant can contain at least one unsaturated bond in a terminal position.

In another aspect of the invention, the hydroxyl functional group-containing polysiloxane can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In another embodiment of the invention, the at least one polysiloxane is a carbamate functional group-containing polysiloxane which comprises the reaction product of at least the following reactants:

at least one polysiloxane containing silicon hydride of structure above where $R^1$, $R^2$, m, n, m' and n' are as described above for that structure;

at least one reactant such as one hydroxyl functional group-containing material having one or more unsaturated bonds capable of undergoing hydrosilylation reaction as described above; and at least one low molecular weight carbamate functional material, comprising the reaction product of an alcohol or glycol ether and a urea.

Examples of such "low molecular weight carbamate functional material" include, but are not limited to, alkyl carbamates such as methyl carbamate and hexyl carbamates, and glycol ether carbamates such as those described in U.S. Pat. Nos. 5,922,475 and 5,976,701, which are incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane and the original alcohol or glycol ether. Reaction conditions and the ratio of reactants are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

In addition to hydroxyl or carbamate functional groups, the at least one polysiloxane can contain one or more other reactive functional groups such as carboxyl groups, isocyanate groups, blocked polyisocyanate groups, carboxylate groups, primary or secondary amine groups, amide groups, urea groups, urethane groups, anhydride groups, hydroxy alkylamide groups, epoxy groups, and mixtures of any of the foregoing.

When the at least one polysiloxane contains carboxyl functional groups, the at least one polysiloxane can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where the at least one polysiloxane contains one or more thioisocyanate functional groups, the at least one polysiloxane can be prepared by reacting at least one polysiloxane containing hydroxyl functional groups as described above with a polythioisocyanate, such as a dithioisocyanate. Nonlimiting examples of suitable polythioisocyanate include aliphatic polythioisocyanates, such as aliphatic dithioisocyanate, for example, 1,4-tetramethylene dithioisocyanate and 1,6-hexamethylene dithioisocyanate; cycloaliphatic polythioisocyanates, for example, 1,4-cyclohexyl dithioisocyanate, isophorone diiso dithioisocyanate cyanate, and $\alpha,\alpha$-xylylene dithioisocyanate; and aromatic polyisocyanates, for example, 4,4'-diphenylmethane dithioisocyanate, 1,3-phenylene dithioisocyanate, and tolylene dithioisocyanate.

The substituent group X can comprise a polymeric urethane or urea-containing material which is terminated with thioisocyanate, hydroxyl, primary or secondary amine functional groups, or mixtures of any of the foregoing. When the substituent group comprises such functional groups, the at least one polysiloxane can be the reaction product of at least a polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polythioisocyanates are those described above. Nonlimiting examples of compounds having at least two active hydrogen atoms per molecule include polyols and polyamines containing primary or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine.

In one embodiment, the substituent group X can comprise a polymeric ester-containing group which is terminated with hydroxyl or carboxylic acid functional groups. When X is such a group, the at least one polysiloxane can be the reaction product of one or more polysiloxane polyols as described above, one or more materials having at least one carboxylic acid functional group, and one or more organic polyols.

To form the at least one polysiloxane containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer having at least one epoxy group, for example glycidyl (meth) acrylate and allyl glycidyl ether, and one or more ethylenically unsaturated monomers which have no epoxy functionality.

According to this invention of scratch-resistant coating compositions for golf equipment, there is a plurality of particles such as inorganic, organic, composite, and colloidal particles. The shape or morphology of the particles can vary depending upon the specific embodiment of the present invention and its intended application. For example generally spherical morphologies, such as solid beads, microbeads, or hollow spheres, can be used, as well as particles that are cubic, platy, or acicular, elongated or fibrous. Additionally, the particles can have an internal structure that is hollow, porous or void free, or a combination of any of the foregoing, e.g., a hollow center with porous or solid walls.

Mixtures of one or more particles having different average particle sizes can be incorporated into the compositions in accordance with the present invention to impart the desired properties and characteristics to the compositions. For example, particles of varying particle sizes can be used in the compositions according to the present invention. In one embodiment, the particles have an average particle size less than 50 microns prior to incorporation into the composition. In another embodiment, the present invention is directed to compositions as previously described wherein the particles have an average particle size ranging from 1 to less than 1000 nanometers prior to incorporation into the composition. In another embodiment, the present invention is directed to compositions as previously described wherein the particles have an average particle size ranging from 1 to 100 nanometers prior to incorporation into the composition.

In another embodiment, the present invention is directed to compositions as previously described wherein the particles have an average particle size ranging from 5 to 50 nanometers prior to incorporation into the composition. In another embodiment, the present invention is directed to compositions as previously described wherein the particles have an average particle size ranging from 5 to 25 nanometers prior to incorporation into the composition. The particle size may range between any combination of these values inclusive of the recited values. Where the average particle size of the particles is greater than one micron, the average particle size can be measured according to known laser scattering techniques.

The particles can be formed from materials selected from polymeric and nonpolymeric inorganic materials, polymeric and nonpolymeric organic materials, composite materials, nano materials, and mixtures of any of the foregoing.

The particles suitable for use in the compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example, boron nitride; specific, nonlimiting examples of metal oxides are, for example, zinc oxide; nonlimiting examples of suitable metal sulfides are, for example, molybdenum disulfide, tantalum disulfide, tungsten disulfide, and zinc sulfide; nonlimiting suitable examples of metal silicates are, for example, aluminum silicates and magnesium silicates such as vermiculite.

The particles can comprise, for example, a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the composition of the invention is employed as a transparent topcoat, for example, as a clearcoat in a multi-component composite coating composition, particles should not seriously interfere with the optical properties of the composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to compositions as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to compositions as previously described wherein the particles include colloidal silica. As disclosed above, these materials can be surface-treated or untreated.

The particles can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing. A specific, nonlimiting example of a particle formed from an inorganic polymeric material suitable for use in the present invention is TOSPEARL[20], which is a particle formed from cross-linked siloxanes and is commercially available from Toshiba Silicones Company, Ltd. of Japan.

The particles can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

The particles can also be formed from synthetic, organic polymeric materials. Nonlimiting examples of organic polymeric materials suitable as particles include, but are not limited to, thermoset materials and thermoplastic materials. Nonlimiting examples of thermoplastic materials suitable as particles include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of thermoset materials suitable as particles include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle.

The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material such as silicon carbide or aluminum nitride can be provided with a silica, carbonate or nanoclay coating to form a useful composite particle. In another nonlimiting example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE, which is a synthetic polymeric particle coated with calcium carbonate that is commercially available from Pierce and Stevens Corporation of Buffalo, N.Y.

When colloidal silica is used as part of coating, the solvent typically includes water or one or more ketones, alcohols, or any combination thereof.

In one particular aspect of the invention, the scratch-resistant golf composition contains a relatively "hard" material that includes colloidal silica in an amount sufficient to increase the abrasion resistance of the coating, and optionally includes one or more types of organic or inorganic particles, which is dispersed throughout the polymer and bonded to at least one of the reactive components by the coupling agent. The colloidal silica can include untreated or pretreated colloidal silica(s), or silica related compounds, such as those sold commercially as Cab-O-Sil by Cabot Corp. of Tuscola, Ill. or NYACOL 2040 by Nano Technologies of Ashland, Mass., HYLINK OG series by Clariant Corporation of Charlotte, N.C., or the SNOWTEX series of colloidal silica by Nissan Chemical Industries of Tokyo, Japan. In one preferred embodiment, optional hard particles including corundum and oxides such as MgO, zirconium oxide or ZnO, can be included in the composition with the colloidal silica to improve the abrasion resistance. The colloidal silica is typically present in the coating material in an amount of greater than 5 weight percent, preferably about 5 to 80 percent, and more preferably from about 5 to 60 percent by weight of the composition. In one preferred embodiment, the colloidal silica is present in an amount of about 10 to 30 percent, and in another preferred embodiment it is present in an amount from about 15 to 20 percent by weight of the composition.

A suitably glossy coating having sufficient scratch resistance can be achieved using such amounts of colloidal silica in the coating of the invention. In a preferred embodiment, stratch resistance can be significantly improved by the dispersion of the colloidal silica in a matrix formed from acrylate or methacrylate functional monomers and oligomers.

Coatings may be produced, for example, which contain small spherical particles of silica, linked to the organic matrix through a silane coupling agent interface. The nanometer size of the silica particles and the refractive index of said material are useful for clear coatings, since they do not cause light scattering and thus do not interfere with the light transmission in the way fillers of larger particle size do. For pigmented or tinted coatings this is not an issue. In a preferred embodiment of the invention, the colloidal silica microparticles range in size from about 1 nm to 200 nm. In one embodiment, the colloidal silica microparticles range in size from about 50 nm to 100 nm.

The colloidal silica is typically used in the invention dispersed in a solvent. The solvent can include monomer or oligomer, or both. The solvent can include water for water-reducible coatings. For dual cure systems, the solvent can be a monomer or oligomer. "Dual cure" refers to curing that includes a combination of at least heat and ultraviolet radiation. Those of ordinary skill in the art can readily determine other suitable solvents used with the colloidal silica, particularly with reference to the description of the invention herein.

Any hard material that is capable of being triturated and which has a hardness greater than that of the material forming the continuous phase of the coating may be optionally used in the present invention with the colloidal silica. In a preferred embodiment of the invention, a material having a Mohs hardness greater than or equal to about 5 is used. It is also preferred to use particulate matter which is capable of being bound to a continuous phase coating material through a use of a coupling reaction.

Optional hard particulate materials for use as part of the colloidal silica in the coating of the invention include, but are not limited to: Actinolite; Aegirine; Akermanite; Almandine; Analcite; Anatase; Andalusite; Andesine; Andradite; Anorthite; Anorthoclase; Anthophyllite; Apatite; Arsenopyrite; Augelite; Augite; Axinite; Baddeleyite; Benitoite; Bertrandite; Beryl; Beryllonite; Bixbyite; Boracite; Braunite; Bravoite; Breithauptite; Brookite; Cancrinite; Cassiterite; Celsian; Chloritoid; Chondrodite; Chromite; Chrysoberyl; Clinozoisite; Cobaltite; Columbite; Cordierite; Cordundum; Cristobalite; Cummingtonite; Danburite; Datolite; Derbylite; Diamond; Diaspore; Diopside; Dioptase; Enstatite; Epidote; Euclasite; Eudialite; Euxenite; Fayalite; Fergussonite; Forsterite; Franklinite; Gahnite; Gehlenite; Geikielite; Glaucophane; Goethite; Grossularite; Hambergite; Hausmannite; Hauyne; Hendenbergite; Helvite; Hematite; Hemimorphite; Hercynite; Herderite; Homblende; Humite; Hydrogrossularite; Ilmenite; Jadeite; Kaliophyllite; Kyanite; Lawsonite; Lazulite; Lazurite; Lepidocrocite; Leucite; Loellingite; Manganosite; Marcasite; Marialite; Meionite; Melilite; Mesolite; Microcline; Microlite; Monticellite; Nepheline; Niccolite; Nosean; Oligoclase; Olivine; Opal; Orthoclase; Orthopyroxene; Periclase; Pekovskite; Petalite; Phenakite; Piemontite; Pigeonite; Pollucite; Prehnite; Pseudobrookite; Psilomelane; Pumpellyite; Pyrite; Pyrochlore; Pyrolusite; Pyrope; Quartz; Rammelsbergite; Rhodonite; Rutile; Samarskite; Sapphirine; Scapolite; Silica; Sodalite; Sperrylite; Spessartite; Sphene; Spinel; Spodumene; Staurolite; Stibiotantalite; Tantalite; Tapiolite; Thomsonite; Thorianite (R); Topaz; Tourmaline; Tremolite; Tridymite; Ullmannite; Uraninite (R); Uvarovite; Vesuvianite; Wagemite; Willemite; Zircon; and Zoisite; and combinations thereof, as named in the table "Physical Constants of Minerals" from the CRC HANDBOOK OF CHEMISTRY & PHYSICS, 52ND EDITION 1971–1972 (P. 193–197) THE CHEMICAL RUBBER CO., CLEVELAND, OHIO.

In one preferred embodiment, the hard particulate material is present in the coating in an amount of about 2 to 25 weight percent in addition to the colloidal silica.

In certain embodiments of the present invention related to a cured composition, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking.

The presence and degree of crosslinking, i.e., the crosslink density, in a polymeric network can be determined by a variety of methods, such as dynamic mechanical thermal analysis (DMTA) using a TA Instruments DMA2980 DMTA analyzer conducted under nitrogen. This method determines the glass transition temperature and crosslink density of free films of coatings or polymers. These physical properties of a cured material are related to the structure of the crosslinked network.

In one embodiment, the present invention is directed to a cured composition as previously described in which the at least one polysiloxane comprises reactive functional groups which are thermally curable functional groups. In an alternative embodiment, at least one of the reactive functional groups of the polysiloxane can be curable by ionizing radiation or actinic radiation. In another alternative embodiment, the polysiloxane can comprise at least one functional group which is curable by thermal energy and at least one functional group which is curable by ionizing or actinic radiation.

While various types of ionizing irradiation are suitable during the composition, such as X-ray, gamma and beta rays, the radiation produced by accelerated high energy electrons or electron beam devices is preferred. The amount of ionizing radiation in rads for curing compositions according to the present invention can vary based upon such a factors as the components of the coating formulation, the thickness of the coating upon the substrate, the temperature of the coating composition and the like. Generally, a 1 mil (25 micrometer) thick wet film of a coating composition according to the present invention can be cured in the presence of oxygen through its thickness to a tack-free state upon exposure to from 0.5 to 5 megarads of ionizing radiation.

Actinic radiation that can be used to cure coating compositions of the present invention generally has wavelengths of electromagnetic radiation ranging from 150 to 2,000 nanometers (nm), can range from 180 to 1,000 nm, and also can range from 200 to 500 nm.

Examples of suitable ultraviolet light sources include mercury arcs, carbon arcs, low, medium or high pressure mercury lamps, swirl-flow plasma arcs and ultraviolet light emitting diodes. Preferred ultraviolet light-emitting lamps are medium pressure mercury vapor lamps having outputs ranging from 200 to 600 watts per inch (79 to 237 watts per centimeter) across the length of the lamp tube. Generally, a 1 mil (25 micrometer) thick wet film of a coating composition according to the present invention can be cured through its thickness to a tack-free state upon exposure to actinic radiation by passing the film at a rate of 20 to 1000 feet per minute (6 to 300 meters per minute) under four medium pressure mercury vapor lamps of exposure at 200 to 1000 millijoules per square centimeter of the wet film.

Useful radiation-curable groups which can be present as reactive functional groups on the polysiloxane include unsaturated groups such as vinyl groups, acrylate groups, methacrylate groups, ethacrylate groups, epoxy groups such as cycloaliphatic epoxy groups. In one embodiment, the UV curable groups can include acrylate groups, maleimides, fumarates, and vinyl ethers.

The scratch resistant coating of the present invention can be used to provide protection against scratching to all golf equipment, including but not limited to golf balls including range balls, golf shoes, golf clubs, gloves, etc. Golf balls of all prices and categories can be coated with the scratch resistant coating of the present invention. Preferred golf balls include those discussed in commonly owned U.S. Pat. No. 6,486,261, which is incorporated herein by reference in its entireties.

In accordance with one embodiment, the cover of the golf balls is relatively soft, i.e., material hardness of less than about 55 Shore D and preferably between about 40 Shore D to about 55 Shore D. The cover can be made from polyurethane, as discussed further below, polyurea, as discussed in U.S. Pat. No. 5,484,870 incorporated herein by reference in its entireties, a soft ionomer, or blends thereof. The cover may comprise one layer or multiple layers.

The '261 patent discloses golf balls comprising a center made from a polybutadiene having a molecular weight of greater than 200,000 and a resilience index of at least about 40 and a cover layer comprising a polyurethane composition formed from a prepolymer having no greater than 7.5 percent by weight unreacted isocyanate groups. Preferably, the resilience index is greater than about 50. Alternatively, the polybutadiene can have a molecular weight of greater than 300,000, and the polybutadiene could be a cis-polybutadiene.

The prepolymer may include an isocyanate, at least one polyol, and at least one curing agent. Preferably, the isocyanate includes 4,4'-diphenylmethane diisocyanate, polymeric 4,4'-diphenylmethane diisocyanate, carbodimide-modified liquid 4,4'-diphenylmethane diisocyanate, 4,4'-dicyclohexylmethane diisocyanate, p-phenylene diisocyanate, toluene diisocyanate, isophoroncdiisocyanate, p-methylxylene diisocyanate, m-methylxylene diisocyanate, o-methylxylene diisocyanate, or a mixture thereof. The at least one polyol may include polyether polyols, hydroxy-terminated polybutadiene, polyester polyols, polycaprolactone polyols, polycarbonate polyols, and mixtures thereof. The curing agent may include a polyamine curing agent, a polyol curing agent, or a mixture thereof. It is preferred, however, that the curing agent is a polyamine curing agent.

If the polyamine is selected as the curing agent, the polyamine curing agent may include 3,5-dimethylthio-2,4-toluenediamine and isomers thereof; 3,5-diethyltoluene-2,4-diamine and isomers thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and mixtures thereof.

In one embodiment, however, the curing agent is a polyol curing agent. If the curing agent is a polyol, preferably, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl) ether; trimethylol propane, and mixtures thereof.

In another embodiment, the prepolymer has between about 2.5 percent and about 7.5 percent by weight unreacted isocyanate groups. The cover layer preferably has a thickness of less than about 0.05 inches. Further, the center should have a Mooney viscosity of between about 40 and about 80 and, preferably, between about 45 and about 60. In a preferred embodiment, the polybutadiene has a vinyl-polybutadiene isomer content of less than about 2 percent by weight and the polybutadiene has a cis-isomer content of at least about 95 percent by weight.

The golf ball center outer diameter is preferably of no less than about 1.55 inches and, additionally, the center further includes a material formed from a conversion reaction of polybutadiene having a first amount of trans-polybutadiene, a free radical source, and at least one cis-to-trans catalyst. Preferably, the reaction occurs at a temperature sufficient to form a polybutadiene reaction product having an second amount of trans-polybutadiene greater than the first amount of trans-polybutadiene. The cis-to-trans catalyst may include at least one of an organosulfur component, an inorganic sulfur compound, an aromatic organometallic compound, a metal-organosulfur compound, tellurium, selenium, elemental sulfur, a polymeric sulfur, or an aromatic organic compound. The organosulfur component may include at least one of 4,4'-diphenyl disulfide, 4,4'-ditolyl disulfide, or 2,2'-benzamido diphenyl disulfide. Preferably, the cis-to-trans catalyst is present in an amount from about 0.1 to 10 parts per hundred of polybutadiene.

In another embodiment, the golf ball further includes an intermediate layer juxtaposed between the center and the cover layer, wherein the intermediate layer comprises a material formed from a conversion reaction of polybutadiene having a first amount of trans-polybutadiene, a free radical source, and a cis-to-trans catalyst comprising at least one organosulfur component, wherein the intermediate layer has an outer diameter of no less than about 1.58 inches, and wherein the center has an outer diameter of less than about 1.55 inches. In yet another embodiment, the cover layer comprises an inner cover layer and an outer cover layer, the inner cover layer juxtaposed the center and the outer cover layer. Preferably, at least one of the inner and outer cover layer has a thickness of less than about 0.05 inches.

If present, the inner cover layer is formed from at least one material selected from the group comprising of an ionomer resin, a polyurethane, a polyetherester, a polyetheramide, a polyester, a dynamically vulcanized elastomer, a functionalized styrenebutadiene elastomer, a metallocene polymer, nylon, acrylonitrile butadiene-styrene copolymer or blends thereof. In still another embodiment, the inner cover has an outer diameter of at least about 1.55 inches and, preferably, between about 1.58 and about 1.64 inches. In an additional embodiment, the polyurethane is a thermoplastic or thermoset material.

The amount of coating applied to golf balls is in the range of 0.01 g to 1 g. Preferred reaction and coating conditions vary with both the chemical compositions and the application methodology but are well known in the art. The methodology for coating golf balls according to the present invention can be any that is known to the ordinary skilled artisan and is acceptable for application of a liquid containing particulate matter. Golf ball coating application techniques include spray, electrostatic, dip, spin curtain and those methods described in for example U.S. Pat. Nos. 5,461,109, 5,409,233, 5,000,458, 4,871,589, 4,798,386 and 5,300,325. All of the aforementioned patents, patent applications and other printed publications here and elsewhere in the Detailed Description are incorporated herein by express reference thereto.

In one embodiment, substantially all of the coating remains adhered to the golf ball after repeated hits with a golf club.

In one embodiment, the anti-scratching coating of the present invention can be applied to a golf shaft, at least a portion of iron-type clubs, or at least a portion of metal wood-type drivers. For example, the coating can be disposed over at least a portion of the back cavity of irons, the club face or the crown or sole of metal drivers, to inhibit or avoid abrasion of the club head.

Anti-scratching coating is preferred for club heads that are made from titanium, titanium alloys or blends thereof. Also, club heads with crowns made from composite material can be coated with the scratch resistant coating to improve their durability and appearance. Preferably, composite crowns are not painted to display the composite, and therefore should be coated with the scratch resistant coating.

The Wyzenbeek Abrasion test using 80-grit abrasive sand paper is commonly used to test the abrasion resistant of floor coverings or leathers. This test can be used on balls/clubs coated with the scratch-resistant coating and on uncoated balls/clubs for comparison. The abrasiveness of the sand paper can be adjusted. There are other available abrasion tests.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

What is claimed is:

1. A golf ball, wherein the golf ball has an outer surface covered by a scratch-resistant coating comprising:

at least one polysiloxane having at least one functional group, at least one reactant having a functional group that is reactive to the at least one functional group of the at least one polysiloxane, and a plurality of particles selected from the group consisting of inorganic, organic and composite particles, wherein the coating shows an improvement in scratch resistance, and the at least one polysiloxane is represented by one of the following formulas:

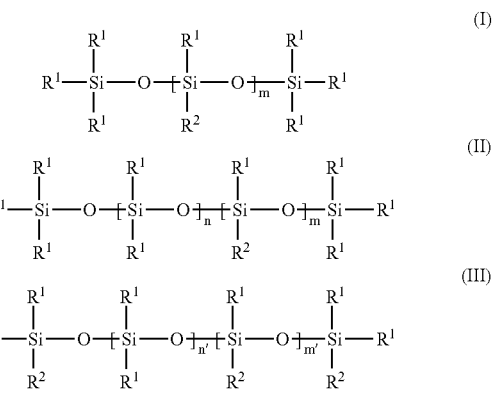

where each $R^1$ is independently selected from the group consisting of H, OH, monovalent hydrocarbon group, and monovalent siloxane group;

each $R^2$ in the formula (I) is independently selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, and epoxy group;

each $R^2$ in the formula (II) independently comprises the structure:

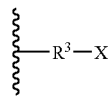

where $R^3$ represents a member selected from the group consisting of $C_2$ to $C_{25}$ alkylene group, oxyalkylene group, alkylene aryl group, alkenylene group, oxyalkenylene group, and alkenylene aryl group, and X represents a member comprising one, two, or more functional groups selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, epoxy group, unsaturated ester group, and onium salt group;

each $R^2$ in the formula (III) independently comprises the structure:

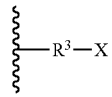

where $R^3$ represents a member selected from the group consisting of $C_2$ to $C_{25}$ alkylene group, oxyalkylene group, alkylene aryl group, alkenylene group, oxyalkenylene group, and alkenylene aryl group, and when $R^3$ is an oxyalkylene group or oxyalkenylene group, X represents a member comprising one, two, or more functional groups selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, epoxy group, unsaturated ester group, and onium salt group, and when $R^3$ is an alkylene group, alkylene aryl group, alkenylene group, or alkenylene aryl group, X represents a member comprising one, two, or more functional groups selected from the group consisting of thioisocyanate group, blocked polythioisocyanate group, amide group, carbamate group, maleimide group, fumarate group, sulfonium group, ammonium group, anhydride group, hydroxy alkylamide group, and onium salt group;

m ranges from 1 to 75; m' ranges from 0 to 75; n' ranges from 0 to 75; and n ranges from 0 to 75;

and wherein the at least one polysiloxane has a functional group equivalent weight of from 50 mg to 1,000 mg per gram of the at least one polysiloxane.

2. The golf ball of claim 1, wherein the plurality of particles further comprises at least one of inorganic, organic and composite particles having size of about 1 nm to about 200 nm.

3. The golf ball of claim 2, wherein the plurality of particles further comprises fumed silica, amorphous silica, colloidal silica, alumina, colloidal alumina, titanium oxide, cesium oxide, yttrium oxide, colloidal yttria, zirconia, colloidal zirconia, polyethylene terephthalate, polybutylene terephthalate, polyethylene naphthalate, vinyl esters, epoxy materials, phenolics, aminoplasts, polyurethanes, silicon carbide, aluminum nitride coated with silica, or carbonate.

4. The golf ball of claim 1, wherein the at least one polysiloxane has a first functional group curable by thermal energy and a second functional group curable by ionizing or actinic radiation.

5. The golf ball of claim 1, wherein at least one $R^2$ in the formulas (I), (II), and (III) comprises an oxyalkylene group or an oxyalkenylene group.

6. The golf ball of claim 5, wherein the at least one $R^2$ further comprises two or more reactive functional groups.

7. The golf ball of claim 1, wherein at least one $R^2$ in the formulas (I), (II), or (III) comprises two or more functional groups selected from the group consisting of hydroxyl group and carbamate group.

8. The golf ball of claim 1, wherein n+m is 2 to 9, or n'+m' is 2 to 9.

9. The golf ball of claim 1, wherein at least one X in the formulas (I), (II), or (III) further comprises urethane group, urea group, or ester group.

10. The golf ball of claim 1, wherein the coating is applied in an amount of 0.01 g to 1 g.

11. A golf ball, wherein the golf ball has an outer surface covered by a scratch-resistant coating comprising:

at least one polysiloxane having at least one functional group, at least one reactant having a functional group that is reactive to the at least one functional group of the at least one polysiloxane, wherein the at least one reactant is a hydroxyl functional group-containing allyl ether, and a plurality of particles selected from the group consisting of inorganic, organic and composite particles, wherein the coating shows an improvement in scratch resistance, and the at least one polysiloxane is represented by one of the following formulas:

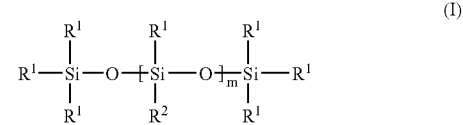

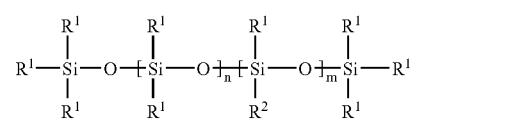

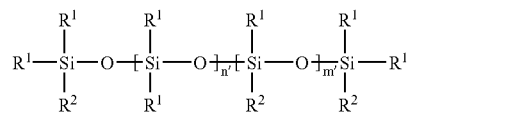

where m ranges from 1 to 75: m' ranges from 0 to 75: n ranges from 0 to 75: and n' ranges from 0 to 75:

each $R^1$ is independently selected from the group consisting of H, OH, monovalent hydrocarbon group, and monovalent siloxane group;

each $R^2$ in the formula (I) is independently selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, and epoxy group;

each $R^2$ in the formula (II) independently comprises the structure:

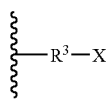

where $R^3$ represents a member selected from the group consisting of $C_2$ to $C_{25}$ alkylene group, oxyalkylene group, alkylene aryl group, alkenylene group, oxyalkenylene group, and alkenylene aryl group, and X represents a member comprising one, two, or more functional groups selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, epoxy group, unsaturated ester group, and onium salt group;

each $R^2$ in the formula (III) independently comprises the structure:

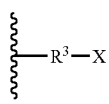

where $R^3$ represents a member selected from the group consisting of $C_2$ to $C_{25}$ alkylene group, oxyalkylene group, alkylene aryl group, alkenylene group, oxyalkenylene group, and alkenylene aryl group, and when $R^3$ is an oxyalkylene group or oxyalkenylene group, X represents a member comprising one, two, or more functional groups selected from the group consisting of hydroxyl group, carboxyl group, thioisocyanate group, blocked polythioisocyanate group, primary amine group, secondary amine group, amide group, carbamate group, vinyl group, acrylate group, methacrylate group, maleimide group, fumarate group, sulfonium group, ammonium group, anhydride group, hydroxy alkylamide group, epoxy group, unsaturated ester group, and onium salt group, and when $R^3$ is an alkylene group, alkylene aryl group, alkenylene group, or alkenylene aryl group, X represents a member comprising one, two, or more functional groups selected from the group consisting of thioisocyanate group, blocked polythioisocyanate group, amide group, carbamate group, maleimide group, fumarate group, sulfonium group, ammonium group, anhydride group, hydroxy alkylamide group, and onium salt group.

12. A golf ball, wherein the golf ball has an outer surface covered by a scratch-resistant coating comprising:
  at least one polysiloxane having at least one functional group selected from the group consisting of thioisocyanate group, blocked polythioisocyanate group, amide group, carbamate group, maleimide group, fumarate group, onium salt group, anhydride group, and hydroxy alkylamide group;
  at least one reactant having a functional group that is reactive to the at least one functional group of the at least one polysiloxane, and
  a plurality of particles selected from the group consisting of inorganic, organic and composite particles,
  wherein the coating shows an improvement in scratch resistance.

* * * * *